(12) United States Patent
Zhang et al.

(10) Patent No.: US 9,264,855 B2
(45) Date of Patent: Feb. 16, 2016

(54) CELL LOCATION ESTIMATION

(71) Applicant: QUALCOMM Incorporated, San Diego, CA (US)

(72) Inventors: Gengsheng Zhang, Cupertino, CA (US); Weihua Gao, San Jose, CA (US); Sai Pradeep Venkatraman, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/585,966

(22) Filed: Dec. 30, 2014

(65) Prior Publication Data

US 2016/0007147 A1 Jan. 7, 2016

Related U.S. Application Data

(60) Provisional application No. 62/020,015, filed on Jul. 2, 2014.

(51) Int. Cl.
| | |
|---|---|
| *H04W 64/00* | (2009.01) |
| *H04W 4/02* | (2009.01) |
| *G01S 5/02* | (2010.01) |
| *H04W 4/04* | (2009.01) |

(Continued)

(52) U.S. Cl.
CPC ............... *H04W 4/02* (2013.01); *H04W 64/00* (2013.01); *G01S 5/0027* (2013.01); *G01S 5/0236* (2013.01); *G01S 5/0242* (2013.01); *G01S 5/0252* (2013.01); *H04L 67/18* (2013.01); *H04W 4/021* (2013.01); *H04W 4/023* (2013.01); *H04W 4/027* (2013.01); *H04W 4/028* (2013.01); *H04W 4/04* (2013.01); *H04W 28/0226* (2013.01)

(58) Field of Classification Search
CPC ... G01S 5/0236; G01S 5/0242; G01S 5/0027; G01S 5/0252; G01S 5/0215; G06F 17/30241; H04W 4/02; H04W 64/00; H04W 28/0226; H04W 4/021; H04W 4/04; H04W 4/027; H04W 4/028; H04W 4/023; H04L 67/18
See application file for complete search history.

(56) References Cited

U.S. PATENT DOCUMENTS

| | | | |
|---|---|---|---|
| 8,219,116 B1 * | 7/2012 | Ji | H04W 64/003 |
| | | | 455/443 |
| 8,744,484 B2 * | 6/2014 | Do | H04W 16/18 |
| | | | 455/456.1 |

(Continued)

FOREIGN PATENT DOCUMENTS

WO WO-2007109880 A1 10/2007

OTHER PUBLICATIONS

International Search Report and Written Opinion—PCT/US2015/034776—ISA/EPO—Sep. 4, 2015.

(Continued)

*Primary Examiner* — Nizar Sivji
(74) *Attorney, Agent, or Firm* — Kilpatrick Townsend & Stockton LLP

(57) ABSTRACT

Techniques are disclosed for estimating a cell center and/or coverage area of an antenna, and geographic coverage of cell IDs associated therewith, using crowdsourcing data from mobile phones. The techniques described herein can utilize two different data sets to accommodate changes in the geographical coverage associated with a cell ID and reduce the probability of putting the cell center estimate in awkward or unlikely locations.

19 Claims, 6 Drawing Sheets

(51) Int. Cl.
  *G01S 5/00* (2006.01)
  *H04W 28/02* (2009.01)
  *H04L 29/08* (2006.01)

(56) References Cited

U.S. PATENT DOCUMENTS

| | | | |
|---|---|---|---|
| 2003/0235164 A1* | 12/2003 | Rogers | H04W 64/006 370/331 |
| 2008/0318596 A1 | 12/2008 | Tenny | |
| 2010/0120394 A1 | 5/2010 | Mia et al. | |
| 2011/0053613 A1 | 3/2011 | Zhou et al. | |
| 2011/0177831 A1* | 7/2011 | Huang | G06F 17/3087 455/457 |
| 2014/0135043 A1* | 5/2014 | Shinada | H04W 24/10 455/457 |
| 2014/0221005 A1* | 8/2014 | Marshall | G01S 5/021 455/456.1 |
| 2014/0274113 A1* | 9/2014 | Teed-Gillen | H04W 64/00 455/456.1 |
| 2015/0004997 A1* | 1/2015 | Gao | H04W 24/10 455/456.1 |

OTHER PUBLICATIONS

Neidhardt, E., et al., "Estimating Locations and Coverage Areas of Mobile Network Cells based on Crowdsourced Data", Wireless and Mobile Networking Conference (WMNC), 2013 6TH Joint IFIP, IEEE, Apr. 23, 2013. 8 pages.

* cited by examiner ns, approximate coverage regions of the plurality of antennas, or both; wherein the updating comprises indicating, in the almanac, the change. The method may comprise communicating at least a portion of the updated almanac to multiple mobile devices. Determining the change can further include comparing a first calculation with a second calculation, where the first calculation is based on a first subset of the plurality of location information entries having corresponding time indicators spanning over a first period within the period of time, and the second calculation is based on a second subset of the plurality of location information entries having corresponding time indicators spanning over a second period within the period of time, the second period being shorter than the first period. The second period can follow the first period, or the second period can overlap with the first period. The calculating may comprise determining, for each location information entry of the first subset of the plurality of location information entries, a district corresponding to the location of the mobile device, and using, in the first calculation, a number of unique districts corresponding to the first subset of the plurality of location information entries, wherein the number of unique districts meets a certain minimum threshold. The calculating can comprises determining, for each location information entry of the second subset of the plurality of location information entries, a district corresponding to the location of the mobile device, and using, in the second calculation, a number of unique districts corresponding to the second subset of the plurality of location information entries, wherein the number of unique districts meets a certain minimum threshold. The calculating may comprise determining a weighted mean based on the location data of at least two location information entries of the plurality of location information entries. The calculating may comprise determining a weighted median based on the location data of at least two location information entries of the plurality of location information entries. The calculating may comprise determining, for each location information entry of the plurality of location information entries, representative coordinates of a district corresponding to the location of a mobile device.

CELL LOCATION ESTIMATION

CROSS-REFERENCE TO RELATED APPLICATIONS

This application claims the benefit of U.S. Provisional Patent Application Ser. No. 62/020,015, entitled "CELL LOCATION ESTIMATION," filed on Jul. 2, 2014, which is assigned to the assignee hereof and incorporated herein by reference for all purposes.

BACKGROUND

A wireless wide area network (WWAN) can utilize mobile telecommunication cellular network technologies such as Long-Term Evolution (LTE), WiMAX, and the like to enable electronic devices such as mobile phones to transmit and receive data over a large geographical region. Such WWANs can utilize antennas (e.g., cell towers), where each antenna has one or more cell identifiers (cell IDs), each corresponding to a cell that covers a geographical region. The antennas offer a coverage area in which electronic devices can communicate wirelessly with the antenna.

Because cell IDs can be linked to a certain geographic areas, they can be utilized to facilitate positioning of a mobile device (e.g., by providing initial location information to speed up positioning in a Satellite Positioning System (SPS)) and/or perform other location-related functions). Increased consumer demand, coverage needs, and other factors can result in changes to the WWAN to address these factors (e.g., adding, removing, or moving antennas) which, in turn, may result in reallocation of cell IDs. If this results in a change in a geographical region with which a cell ID is associated, it may cause disruptions or errors in services (such as SPS) that use the cell ID as a geographical reference.

SUMMARY

Techniques disclosed herein can help estimate a cell center and coverage area radius of an antenna, and geographic coverage of cell IDs associated therewith, using crowdsourcing data from mobile phones. The techniques described herein can utilize two different data sets to accommodate changes in the geographical coverage associated with a cell ID and reduce the probability of putting the cell center estimate in awkward or unlikely locations.

An example method of estimating wireless network coverage, according to the disclosure, comprises accumulating, over a period of time, location information received from a plurality of mobile devices located within range of an antenna in a wireless network. The accumulated location information comprises a plurality of location information entries, where each location information entry comprises location data indicative of a location of a mobile device, a time indicator associated with the location data, and an identifier associated with the antenna. The method further comprises calculating an approximate coverage region of the antenna, an approximate location of the antenna, or both. The calculating is based at least in part on the location data and the identifier of each of the plurality of location information entries, and the location data is selected based on the time indicator.

The example method may comprise one or more of the following features. The method may comprise determining, based on the calculating, a change in the approximate coverage region of the antenna, the approximate location of the antenna, or both. The method may comprise updating an almanac having approximate locations of a plurality of antennas, approximate coverage regions of the plurality of antennas, or both; wherein the updating comprises indicating, in the almanac, the change.

An example server for estimating wireless network coverage, according to the disclosure, may comprise a communication interface configured to receive location information from a plurality of mobile devices located within range of an antenna in a wireless network, and a memory configured to accumulate the location information over a period of time. The accumulated location information comprises a plurality of location information entries, where each location information entry comprises location data indicative of a location of a mobile device, a time indicator associated with the location data, and an identifier associated with the antenna. The server further comprises a processor communicatively coupled with the communication interface and the memory and configured to calculate an approximate coverage region of the antenna, an approximate location of the antenna, or both. The calculating is based at least in part on the location data and the identifier of each of the plurality of location information entries, and the location data is selected based on the time indicator.

The example server may comprise one or more of the following features. The processor can be further configured to determine, based on the calculating, a change in at least one of the approximate coverage region of the antenna and/or the approximate location of the antenna. The memory can be configured to store an almanac comprising approximate locations of a plurality of antennas, and the processor can be further configured to cause the server to update the almanac based on the determined change by altering an approximate location of at least one antenna of the plurality of antennas. The processor can be further configured to cause the server to communicate, via the communication interface, at least a portion of the updated almanac to multiple mobile devices. The processor can be configured to determining the change by comparing a first calculation with a second calculation, where the first calculation is based on a first subset of the plurality of location information entries having corresponding time indicators spanning over a first period within the period of time, and the second calculation is based on a second subset of the plurality of location information entries having corresponding time indicators spanning over a second period within the period of time, the second period being shorter than the first period. The processor can be configured to implement the calculating by determining, for each location information entry of the first subset of the plurality of location information entries, a district corresponding to the location of the mobile device, and determining that a number of unique districts corresponding to the first subset of the plurality of location information entries meets a certain minimum threshold. The processor can be configured to implement the calculating by determining, for each location information entry of the second subset of the plurality of location information entries, a district corresponding to the location of the mobile device, and determining that a number of unique districts corresponding to the first subset of the plurality of location information entries meets a certain minimum threshold. The processor can be configured to determine, for each location information entry of the plurality of location information entries, representative coordinates of a district corresponding to the location of a mobile device.

An example apparatus, according to the disclosure, comprises means for accumulating, over a period of time, location information received from a plurality of mobile devices located within range of an antenna in a wireless network, where the accumulated location information comprises a plurality of location information entries. Each location information entry comprises location data indicative of a location of a mobile device, a time indicator associated with the location data, and an identifier associated with the antenna. The apparatus further comprises means for calculating an approximate coverage region of the antenna, an approximate location of the antenna, or both. The calculating is based at least in part on the location data and the identifier of each of the plurality of location information entries, and the location data is selected based on the time indicator.

The example apparatus may comprise one or more of the following features. The apparatus can further include means for determining, based on the calculating, a change in the approximate coverage region of the antenna, and/or the approximate location of the antenna. The apparatus can further include means for updating an almanac having approximate locations of a plurality of antennas, the updating comprising altering an approximate location of at least one antenna of the plurality of antennas. The apparatus can further include means for communicating at least a portion of the updated almanac to multiple mobile devices. The means for determining the change can further include means for comparing a first calculation with a second calculation, where the first calculation is based on a first subset of the plurality of location information entries having corresponding time indicators spanning over a first period within the period of time, and the second calculation is based on a second subset of the plurality of location information entries having corresponding time indicators spanning over a second period within the period of time, the second period being shorter than the first period. The means for calculating may comprise means for determining, for each location information entry of the first subset of the plurality of location information entries, a district corresponding to the location of the mobile device; and means for determining that a number of unique districts corresponding to the first subset of the plurality of location information entries meets a certain minimum threshold. The means for calculating may comprise means for determining, for each location information entry of the second subset of the plurality of location information entries, a district corresponding to the location of the mobile device; and means for determining that a number of unique districts corresponding to the first subset of the plurality of location information entries meets a certain minimum threshold.

An example non-transitory computer-readable storage medium, according to the disclosure, can have instructions embedded thereon that, when executed by one or more electronic devices, cause the one or more electronic devices to accumulate, over a period of time, location information received from a plurality of mobile devices located within range of an antenna in a wireless network, where the accumulated location information comprises a plurality of location information entries. Each location information entry comprising location data indicative of a location of a mobile device, a time indicator associated with the location data, and an identifier associated with the antenna. The instructions further cause the one or more electronic devices to calculate an approximate coverage region of the antenna, an approximate location of the antenna, or both. The calculating is based at least in part on the location data and the identifier of each of the plurality of location information entries, and the location data is selected based on the time indicator.

The example non-transitory computer-readable storage medium may comprise instructions for implementing one or more of the following features. Determining, based on the calculating, a change in the approximate coverage region of the antenna, and/or the approximate location of the antenna. The instructions for determining the change further include instructions for comparing a first calculation with a second calculation, where the first calculation is based on a first subset of the plurality of location information entries having corresponding time indicators spanning over a first period within the period of time, and the second calculation is based on a second subset of the plurality of location information entries having corresponding time indicators spanning over a second period within the period of time, the second period being shorter than the first period.

Items and/or techniques described herein may provide one or more of the following capabilities, as well as other capabilities not mentioned. Techniques can provide for relatively quick accommodation of geographical changes of a cell ID in a wireless network via mobile phones without input from a network provider. These and other advantages and features are described in more detail in conjunction with the text below and attached figures.

BRIEF DESCRIPTION OF THE DRAWINGS

An understanding of the nature and advantages of various embodiments may be realized by reference to the following figures.

DETAILED DESCRIPTION

Figure 1:
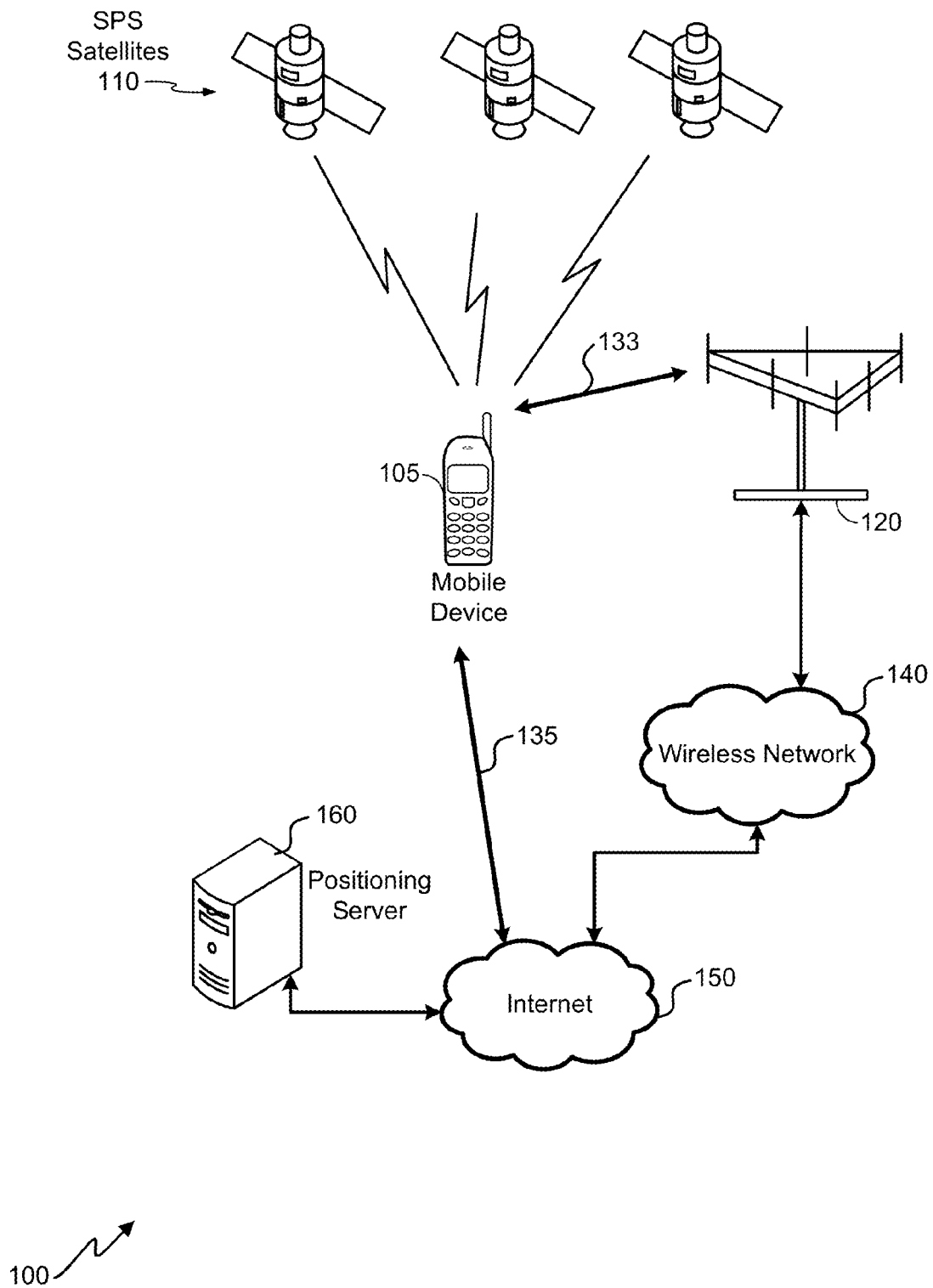
FIG. 1 is a simplified illustration of a cell location estimation system, according to one embodiment.

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

A wireless wide area network (WWAN) can utilize mobile telecommunication cellular network technology to enable electronic devices such as mobile phones to transmit and receive data over a large geographical region, using antennas (e.g., cell towers). In such a network, each antenna can have one or more cell identifiers (cell IDs), each corresponding to a cell that covers a geographical region, to offer a coverage area in which electronic devices can communicate wirelessly with the antenna. Because cell IDs can be linked to a certain geographic areas, they can be utilized to facilitate positioning of a mobile device (e.g., by providing initial location information to speed up positioning in a Satellite Positioning System (SPS)) and/or perform other location-related functions. The geographical locations of various cells in a WWAN can be stored in an almanac maintained and updated by a positioning server, which can propagate the almanac to mobile devices communicating on the WWAN.

Increased consumer demand, coverage needs, and other factors can prompt a WWAN provider, such as a cell-phone carrier, to reconfigure the network by adding, removing, or relocating antennas. This, in turn, may result in reallocation of cell IDs. But because the positioning server is often maintained by an entity separate from the WWAN provider, and because the WWAN provider may not relay changes in the allocation of cell IDs to the entity maintaining the positioning server, the positioning server may not immediately reflect these changes in its almanac of cell IDs. Thus, if the reallocation of cell IDs results in a change in a geographical region with which a cell ID is associated, it may cause disruptions or errors in services (such as SPS) that use the cell ID as a geographical reference until the almanac is properly updated.

Techniques disclosed herein can help estimate a cell center and coverage area radius of an antenna, and geographic coverage of cell IDs associated therewith, using crowdsourced data from mobile phones. Such techniques can be used by a positioning server, for example. Among other advantages, the techniques described herein can utilize two different data sets to accommodate changes in the geographical coverage associated with a cell ID and reduce the probability of putting the cell center estimate in awkward or unlikely locations. It is noted that the cell center is typically considered to be at the antenna. Moreover, even in sectorized cells (where the antenna is likely not located in the center of coverage), the location of the antenna itself rather than the center of coverage is typically desired. Thus, embodiments described herein include calculating an antenna location. That said, the center of coverage and/or other aspects of cell coverage may be calculated using techniques described herein.

FIG. 1 is a simplified illustration of a cell location estimation system 100 capable of implementing these techniques, according to one embodiment. The cell location estimation system 100 may comprise at least one mobile device 105, SPS satellites 110, wireless network 140, antenna 120, positioning server 160, and the Internet 150. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the cell location estimation system 100. Similarly, the cell location estimation system 100 may include many antennas 120. Furthermore, components may be rearranged, combined, separated, substituted, and/or omitted, depending on desired functionality. A person of ordinary skill in the art will recognize many modifications to the components illustrated.

Broadly speaking, the cell location estimation system 100 can use location data of the mobile device 105 to estimate the location of the antenna 120 and/or the cell IDs associated therewith. Mobile devices may be owned and used by different users at different times and in different locations. The resulting location data can thus said to be crowd sourced. Each mobile device 105 can receive a signal from an antenna 120 and thus is within range of the antenna 120. Colloquially, a mobile device 105 within range of the antenna 120 is said to be able to "see" the antenna 120. The location (e.g., latitudinal and longitudinal coordinates) of each mobile device 105 can be obtained and transmitted to the positioning server 160 along with an identifier of the antenna 120.

In one example, a mobile device 105 calculates its location using SPS satellites 110, such as the Global Positioning System (GPS) or GLONASS. The mobile device 105 may be within range of multiple antennas 120 and may transmit a message to the positioning server 160 providing the mobile device's calculated location and identifying each the multiple antennas 120 that the mobile device 105 can see.

In some embodiments, the mobile device(s) 105 is/are cellular telephone(s) and the antenna 120 is a cellular antenna (e.g., on a cell tower) operated by a cellular service provider. As previously indicated, the region in which the mobile device(s) 105 can see the cellular antenna is called a cell. The identifier of the cellular antenna 120 is called a cell ID or base station ID (BSID). In other embodiments, the antenna 120 can be a wireless access point (e.g., in a WiFi network).

Depending on desired functionality, a location of the mobile device 105 can be determined in any of a variety of ways, by the mobile device and/or other devices in communication with the mobile device, which may be situation dependent. The positioning server 160 or other computing system, for example, can be used to implement positioning methods for supporting the positioning of a mobile device, typically referred to as a target mobile device, target device or target. These positioning methods may comprise, for example, measurement by a mobile device of signals transmitted by (i) satellite vehicles (SVs) belonging to an SPS, or Global Navigation Satellite System (GNSS); (ii) base stations belonging to a wireless cellular network and/or (iii) access points (APs), home base stations and/or Femtocells with short range (e.g. 100 meters) belonging to a wireless local area network (WLAN) or wireless wide area network (WWAN). Measurements can be of signal time of arrival, signal observed time difference of arrival (OTDOA), signal strength (e.g. received signal strength indication (RSSI)), signal round trip propagation time (RTT) and/or of other signal characteristics. The different signal measurements may be associated with different position methods. For example, with the Assisted GNSS (A-GNSS) position method, a positioning server may send GNSS related assistance data to a mobile device to assist the mobile device to make signal measurements of one or more GNSS systems (e.g. GPS, Glonass, Galileo, Beidou) after which the mobile device or the positioning server may compute a location estimate for the mobile device using the measurements. Similarly with an OTDOA position method, a mobile device may make OTDOA measurements for signals transmitted from base stations in a wireless network supporting the 3rd Generation Partnership Project (3GPP) Long Term Evolution (LTE) wireless technology after which the mobile device or the positioning server may compute the location of the mobile device using the measurements and known locations for the LTE base stations (known as eNodeBs) that were measured. Embodiments utilizing such methods may utilize information received from antennas other than the antenna 120 for which location and/or coverage information is to be estimated. Further, with a WLAN position method, a mobile device may measure RSSI and/or RTT for one or more APs supporting one of the IEEE 802.11 WLAN wireless technologies after which the positioning server or mobile device may compute the location of the mobile device using the RSSI and/or RTT measurements and (i) the known locations of the WiFi APs and/or (ii) radio frequency (RF) heat maps that provide the expected RSSI and/or RTT values that would be measured over a set of grid points (e.g. a rectangular array of grid points at 1 meter intervals covering, say, an area of 200 by 200 meters). In cases where the positioning server computes the location of the mobile device, which is commonly known as User Equipment (UE) assisted mode, the mobile device may first transfer the measurements to the positioning server. In cases where the mobile device computes the location, which is commonly known as UE based mode, the positioning server may first provide assistance data to the mobile device to assist with the location computation—e.g. may provide satellite orbital and timing data for A-GNSS, information about eNodeB locations and timing for OTDOA, or information about AP location and/or AP RF heat maps for the WLAN position method.

The antenna 120 is communicatively coupled to the wireless network 140 (e.g., a cellular network), which may be communicatively coupled with the Internet 150. The positioning server 160 can also be communicatively coupled with the Internet 150. Thus, the mobile device 105 can communicate its location information as well as an identifier of the antenna 120 by transmitting information to the antenna via a first communication link 133 and/or by accessing the Internet via a second communication link 135 (e.g., via a local wireless network). Depending on desired functionality, the mobile device 105 may upload its location data (along with the identifier of the antenna 120) while the mobile device 105 is within range of the antenna 120, and/or it may store its location data and the identifier of the antenna 120 and upload this information at a later time, potentially through a different network connection.

The positioning server 160 can then utilize the location data to estimate the location (e.g., latitude, longitude, and (optionally) altitude) of the antenna 120 and/or the coverage region (e.g., region of a cell) within which the mobile device 105 can see the antenna 120, and similarly estimates coverage regions for other antennas (e.g., other antennas operated by the same service provider as the antenna 120). The positioning server 160 may provide information about the estimated coverage region to mobile device 105. For example, a mobile device 105 that is turned on when located in a particular coverage region may use the estimation location of the coverage region (e.g., the estimated center of the coverage region) as a starting point when determining its location using GPS (or another SPS). Additionally or alternatively, the positioning server 160 can store estimated location and/or coverage of cells and/or antennas in a database (also referred to herein as an antenna almanac), which can be propagated to mobile devices for use in positioning and/or other applications.

Figure 2:
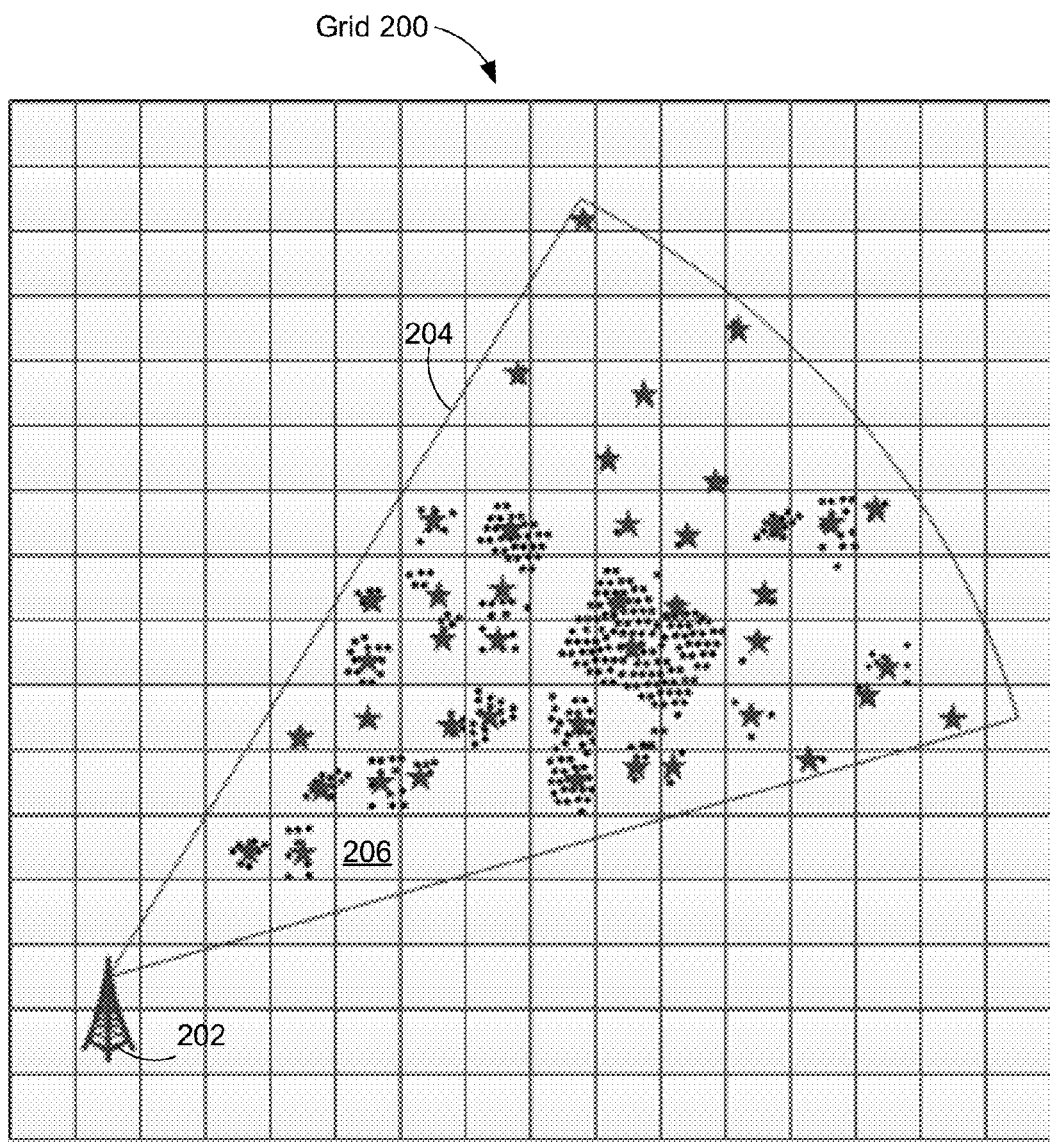
FIG. 2 illustrates crowd-sourced location data for an antenna in accordance with some embodiments.

FIG. 2 illustrates crowd-sourced location data for an antenna (e.g., a cellular antenna) 202 in accordance with some embodiments. The antenna 202 is an example of the antenna 120 (FIG. 1). In this example, the antenna 202 is a directional antenna that, at least in principle, and assuming no obstructions, has a wedge-shaped coverage region 204. In practice, however, the extent of the coverage region 204 can deviate from its theoretical shape and can change over time. For example, a new structure might be built within the coverage region 204 that blocks signals from the antenna 202 and thus alters the coverage region 204.

Each dot in FIG. 2 represents the location 210, at a particular point in time, of a mobile device 105 (FIG. 1) that can see the antenna 202. Multiple dots may correspond to different locations 210 of a single mobile device 105 at different times, and also to locations 210 of different mobile devices 105 at one or more points in time. The locations 210 are mapped onto a grid 200 of squares 206 (or other suitable shapes). This mapping is performed, for example, by the positioning server 160 (FIG. 1). Each square 206 (or other suitable shape) is referred to as a district 206. In one configuration, each district 206 may be 25 $m^2$. However, the grid 200 may be configurable such that the shape and/or size may be modified, depending on desired functionality. "Districts" can therefore be described as predefined areas (e.g., square 206) within a cell coverage region 204 that can be utilized to help ensure special diversity of the location data received from mobile devices 105 within the coverage region 204. As shown in FIG. 2, districts can be mutually exclusive (e.g., non-overlapping) and/or collectively exhaustive (e.g., cover the entire coverage region 204).

According to some embodiments the positioning server 160 can down-sample, or quantize, the location data (based on locations 210) for each district 206 for which location data has been received. In some embodiments, the location data for each district 206 is down-sampled to a single representative location 208. Representative locations 208 for respective districts 206 are shown as stars in FIG. 2. In some embodiments, the representative location 208 for each district 206 may be at a designated coordinate, relative to that district 206 (e.g., a predetermined corner, the center, etc.). The down-sampled location data can be accumulated over time as more crowd-sourced locations 210 are reported to the data positioning server 160. By retaining only down-sampled location data, the amount of data to be stored and processed when determining estimated coverage regions is significantly reduced. Also, down-sampling protects the privacy of individual users of mobile devices 105, because data about the locations 210 of specific mobile devices 105 are not retained. Additional information regarding data aggregation and down sampling techniques can be found in U.S. Pat. No. 8,744,484, entitled "WIRELESS NETWORK COVERAGE ESTIMATION USING DOWN-SAMPLED CROWD-SOURCED DATA," assigned to the assignee hereof and hereby expressly incorporated by reference herein.

According to embodiments, the positioning server 160 can aggregate data (e.g., by storing data in a database) to form two different data sets from which the cell center and/or the coverage region (e.g., a radius from the cell center) can be calculated: a long-term data set, and a short-term data set. As discussed in more detail below, when the calculated cell centers and/or coverage regions from the two data sets differ for a particular cell, the cell center and/or coverage region derived from the short-term data set may be associated with the cell (e.g., the almanac may be updated to reflect the new value(s)), and the data in the long-term data set can be reset.

These long- and short-term data sets can correspond to data collected in relatively long- and short-term intervals, as determined by a time associated with the data provided by the mobile device 105. This time can be included as and/or determined from a time stamp associated with the data. Depending on desired functionality, the time stamp can be created by the mobile device 105 when sending the data, or by the positioning server 160 when receiving the data.

The long-term data set, or Long Accumulated Data Set (LADS), can reflect historical behavior of a cell (e.g., coverage region 204). And thus, cell center and/or coverage region calculated using the LADS is typically stored in the almanac and used by mobile devices.

According to one embodiment, uploaded data from mobile devices is accumulated up to a configurable amount of "blocks" to constitute the LADS. Each block may comprise a minimum number of unique districts 206 from which data has been received (to help ensure special diversity in the accumulated data), and a certain time duration during which data is accumulated. When the positioning server receives data from at least the minimum number of unique districts 206 during the certain time duration, the positioning server 160 can begin accumulating a new block. Otherwise, the block can extend to a second time duration. For each of the unique districts 206, the positioning server 160 can keep the number of data points (e.g., uploaded data from mobile devices) in the unique district for each block.

In one instance, for example, the time duration for a block could be seven days, and the minimum number of unique districts could be 10. In this example, if uploaded data is received from seven unique districts 206 is received over the course of the seven-day sampling period for the block, the block may be extended for another seven days to continue to collect data until the number of unique districts reaches or exceeds 10. On the other hand, if uploaded data is received from 11 unique districts on the first day of sampling, data may still be collected for the remaining six days of the seven-day sampling period before the block is complete. Thus, the time duration of different blocks may be different, depending on whether data was collected from enough unique districts within the designated time duration of a block. (In this example, the lengths of blocks would therefore be integer multiples of a minimum block time duration.)

By maintaining a maximum number of blocks, the LADS can represent data accumulated over a window of time. When the maximum number of blocks is reached, a newly-accumulated block and replace the oldest block in the LADS, thereby making the LADS cover a running "window" of time, where blocks of the LADS are replaced in a first in, first out (FIFO) configuration. For example, in the embodiment above, if blocks have a certain time duration of one week, and the LADS has a maximum number of blocks of 26, then window of data in the LADS can span at least a half year. (Some blocks may be longer than one week, as explained above.) The amount of blocks can be configurable, so that embodiments may use LADS having a number of blocks greater or fewer than 26, depending on desired functionality. Moreover, other time periods utilized in LADS and SADS described herein can also be configurable.

Figure 3:
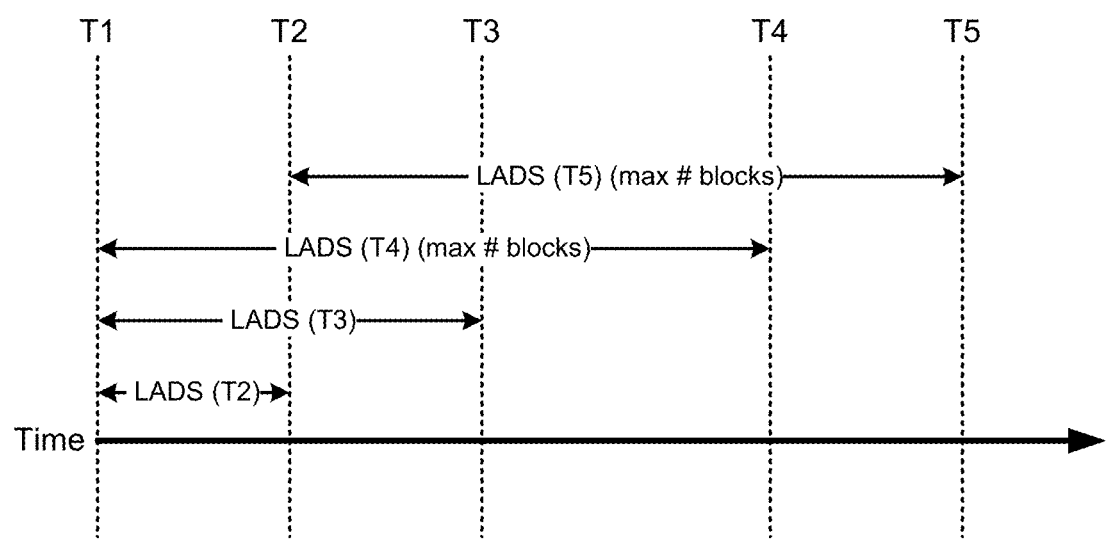
FIG. 3 is a timeline that illustrates how a long-term data set may be accumulated over time, according to one embodiment.

FIG. 3 helps illustrate how the LADS can accumulate data over time. FIG. 3 illustrates a timeline progressing from time T1 through time T5. At time T1, uploaded data from mobile devices is accumulated by, for example, a positioning server (such as the positioning server 160 of FIG. 1). At time T2, the LADS (T2) has accumulated data over a small window (T2–T1), but has not yet reached a maximum number of blocks. At time T3, the LADS (T3) has accumulated data over a larger window of time (T3–T1), but again has not yet reached a maximum number of blocks. At T4, however, the LADS (T4) has reached the maximum number of blocks, and may then begin to expunge the oldest block in the data set for each new block accumulated. Thus, by time T5, LADS (T5) is a dataset that represents a moving window of time, continuing to collect new blocks of data and expunging old blocks of data as time continues to progress.

The short-term data set, or Short Accumulated Data Set (SADS) can reflect new developments in a cell (e.g., coverage region 204). In particular, the SADS can help the positioning server 160 adapt to changes to a cell (e.g., relocation of a cell ID). In one embodiment, the SADS may include a certain period of time in which a data from at least the minimum number of unique districts 206 is accumulated, similar to the embodiment of LADS described above. (Here, however, the certain period of time may be shorter. For example, the certain period of time in one SADS implementation could be one day, where the certain period of time in a LADS implementation may be one week.) Once data from at least the minimum number of unique districts 206 is accumulated and the certain time period has ended, the SADS may be complete (and a new SADS may be started), in contrast to the embodiment of LADS discussed above (which continues to collect blocks of accumulated data until a maximum number of blocks is reached). Again, a SADS may extend longer than the certain time period if data from the minimum number of unique districts 206 has not been accumulated. On the other hand, data from more than the minimum number of unique districts 206 may be included in the SADS if received before the certain time period has ended.

Data from both LADS and SADS not only allow a positioning server 160 to determine estimated location and/or coverage of a cell, but also allow the positioning server 160 to accommodate changes to the coverage of a cell (e.g. reallocation of a cell ID). In one embodiment, upon receiving a new SADS (e.g., $SADS_n$), the positioning server 160 can estimate a cell center and radius using data from the new SADS and compare the estimates with a LADS that corresponds to a previous SADS ($SADS_{n-1}$) to detect if the cell has been relocated. If the difference between the estimates is larger than a certain threshold, the positioning server 160 can "reset" the cell center and radius with the new estimate (e.g., replace previous estimates with new estimates in the cell almanac). The LADS also can be reset (e.g., a new LADS may be started) so that data prior to the data of the new SADS is discarded (data from the new SADS can be included in the new/reset LADS).

Some embodiments may involve a threshold number of divergent SADS in order to reset a cell center. For example, data from a single divergent SADS (i.e. a new SADS from which estimates differ from a previous SADS larger than a certain threshold) may simply be flagged for subsequent verification. If one or more subsequent divergent SADS confirm the estimates of the flagged data, the cell estimates (and corresponding LADS) may be reset. Some embodiments may not reset data unless the subsequent divergent SADS be received within a certain time frame and/or received consecutively after the initial divergent SADS.

To reduce the probability of putting the cell center estimate in awkward or unlikely locations, embodiments may estimate a cell center by calculating a weighted mean and/or weighted median of latitude and longitude values from the data of the LADS or SADS. Calculating a coverage region for the cell, such as a radius, can be similarly straightforward. In some embodiments, for example a standard deviation of the distances of each unique data point of the LADS or SADS to the cell center can be estimated, and then used to calculate a radius estimate. In one embodiment, for example, since the distance of the grid to cell center estimate follows a Rayleigh distribution, the radius estimate can be calculated as:

$$r_{Rayleigh} = \sqrt{-4.6598\ln\left(1 - \frac{p}{100}\right)}\sigma \quad (1)$$

Where p is the configurable percentile of the distance values of upload data to the cell center estimate, and $\sigma$ is the estimated standard deviation.

In equation (1) above, p can operate as a type of outlier removal, which can occur at one or more stages in the processes described herein above to help remove erroneous data. For example, embodiments may include a process during the aggregation of data (e.g., creation of SADS and/or LADS) received from a mobile device 105 involving calculating a median latitude and longitude of unique districts 206 and eliminating (from the SADS and/or LADS) location measurements received from a mobile device 105 that exceed a threshold difference in value from one or both of these medians. In other embodiments, a certain number or percentage of measurements (e.g., 1%) furthest from either or both of these medians may be removed from the SADS and/or LADS. In equation (1) above, where the outlying 1% of data is disregarded, p would therefore be 99. Other such outlier removal techniques may be utilized. According to some embodiments, such outlier removal techniques may not be utilized unless data from a minimum number of unique districts 206 has been received.

Comparing the cell center and/or coverage area calculated using SADS data with counterpart values calculated using LADS data can be done in any of a variety of ways, depending on desired functionality. In one embodiment, for example, a positioning server or other computing device can calculate cell center estimates $C_{SADS}$ and $C_{LADS}$ from SADS and LADS data respectively, as well as a radius of cell coverage, respectively $R_{SADS}$ and $R_{LADS}$. It can then calculate the separation of the circles of cell coverage as follows:

$$\|C_{LADS} - C_{SADS}\| - (R_{LADS} - R_{SADS}) \quad (2)$$

If the separation meets or exceeds a minimum threshold, the positioning server can then flag the data as being different or adjust cell center and/or radius of cell coverage (e.g., update the almanac so that the cell center and/or radius of cell coverage matches the values calculated from the SADS data) and reset the LADS data, as described herein.

Figure 4:
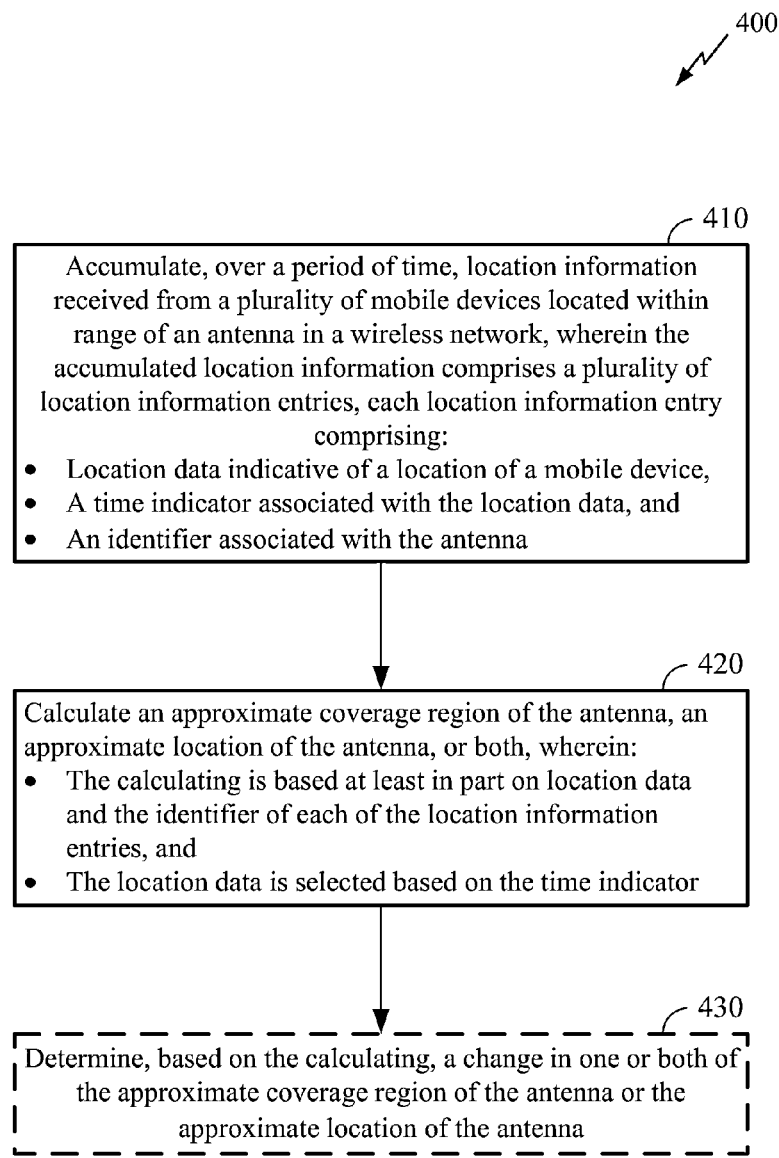
FIG. 4 is a process flow diagram that illustrates a method of estimating wireless network coverage, according to one embodiment.

FIG. 4 is a process flow diagram that illustrates a method 400 of estimating wireless network coverage, according to one embodiment. One or more blocks of the method 400 can be performed by a server, such as the positioning server 160 of the cell location estimation system 100 of FIG. 1, for example. Particular means for performing the illustrated blocks can be performed by hardware and/or software components of a computer system, such as the example computer system illustrated in FIG. 6 and described in further detail below. Additionally, as with other figures provided herein, FIG. 4 is provided as an example. Other embodiments of the invention may perform similar methods in different manners, by, for example, adding, omitting, combining, separating, rearranging, and/or otherwise altering the blocks illustrated in FIG. 4. A person of ordinary skill in the art will recognize many variations.

Figure 6:
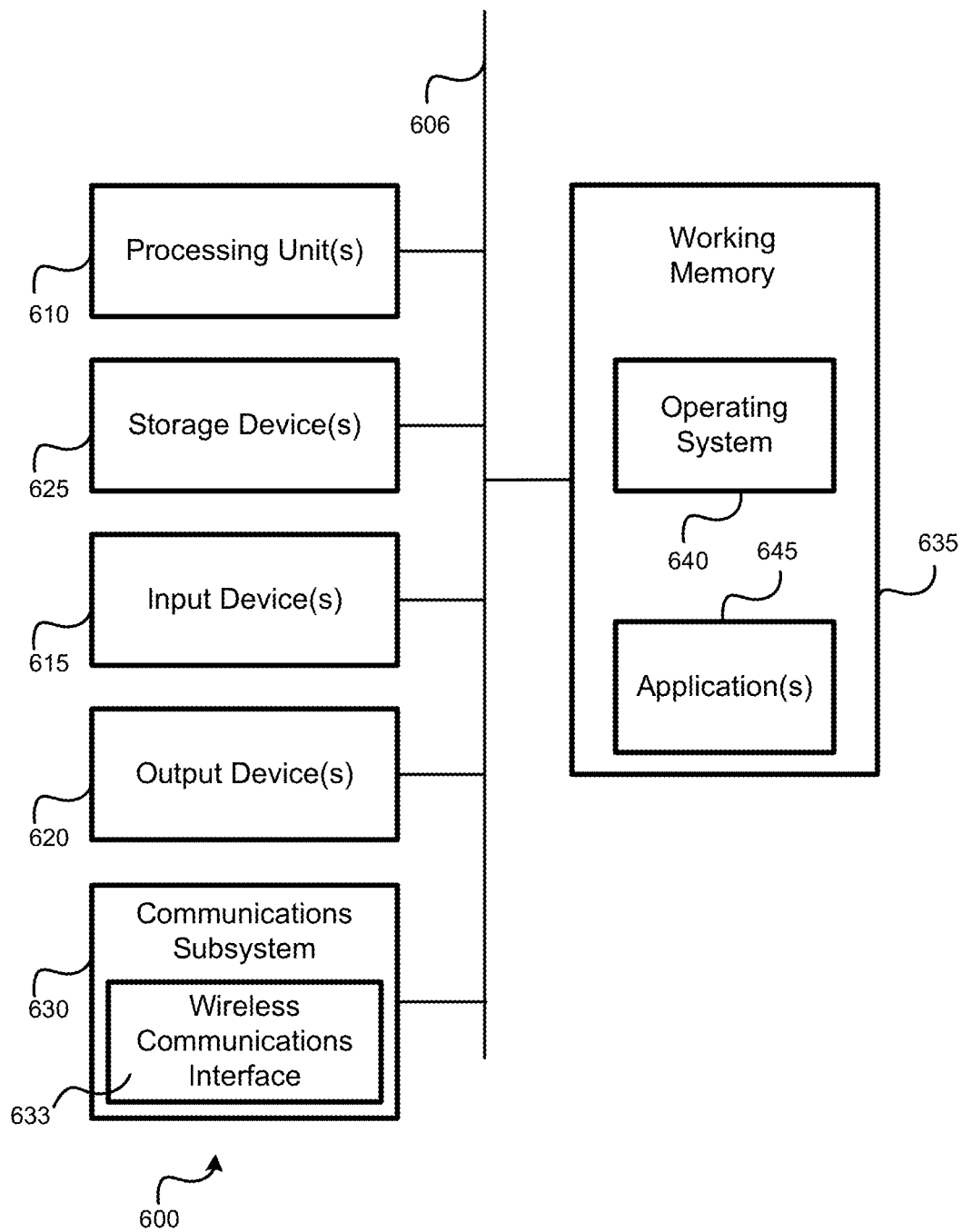
FIG. 6 is a block diagram an embodiment of a computer system.

At block 410, location information received from a plurality of mobile devices located within a range of an antenna in a wireless network is accumulated over a period of time. The accumulated location information may comprise a plurality of location information entries—each comprising uploaded data from a mobile device. The uploaded data may comprise location data indicative of a location of a mobile device, a time indicator (e.g., a time stamp) associated with the location data, and an identifier associated with the antenna (e.g., a cell ID). In some embodiments the time indicator may be inserted into a location information entry (e.g., by a positioning server) rather than included in a mobile device's uploaded data. Means for performing the functionality of block 410 may comprise, for example, the processing unit(s) 610, storage device(s) 625, working memory 635, and/or communication subsystem 630, as shown in FIG. 6 and described in further detail below. For example, the storage device(s) 625, working memory 635 can be configured to accumulate the location information received via the communication subsystem 630 (e.g., a communication interface) from the plurality of mobile devices.

At block 420, an approximate coverage region of the antenna, an approximate location of the antenna, or both, is calculated. The calculating is based at least in part on location data and an identifier of the location information of each of a plurality of location information entries, and the location data is selected based on the time indicator. For example, the location data may be used to estimate the location and/or coverage region, the identifier may be used to determine an identity associated with the antenna, and the time indicator may be used to determine a data set (e.g., SADS and/or LADS) from which the estimates are calculated. Means for performing the functionality of block 420 may comprise, for example, the processing unit(s) 610, storage device(s) 625, and/or working memory 635, as shown in FIG. 6 and described in further detail below. For example, the processing unit(s) 610 can be configured to calculate an approximate coverage region of the antenna, an approximate location of the antenna, or both, and select the location data from which the calculation is made based on the time indicator.

Optionally, at block 430, a change in one or both of the approximate coverage region of the antenna or the approximate location of the antenna is determined, based on the calculating. As previously indicated, this can involve a comparison between new and historical data related to the antenna. As described in further detail below, the change can be reflected in the almanac, and the updated almanac can be propagated to mobile devices (e.g., via the Internet 150 and/or wireless network 140 of FIG. 1). Means for performing the functionality of block 430 may comprise, for example, the processing unit(s) 610, storage device(s) 625, and/or working memory 635, as shown in FIG. 6 and described in further detail below. Means for propagating the almanac to the mobile devices can further include the communications subsystem 630 of FIG. 6.

Different data sets, such as SADS and LADS described in the embodiments above may be used in the determination of the change. For example, determining the change may comprise comparing a first calculation with a second calculation, where the first calculation is based on a first subset of the plurality of location information entries having corresponding time indicators spanning over a first period within the period of time, and the second calculation is based on a second subset of the plurality of location information entries having corresponding time indicators spanning over a second period within the certain period of time, the second period being shorter than the first period. As described in the embodiments above, location information entries in the LADS can be collected over the course of weeks or months, for example, where location information entries in the SADS can be collected over days or weeks. (Other embodiments may include longer or shorter time frames for LADS and/or SADS, depending on desired functionality.) And thus time stamps of the location information entries in the SADS may span a shorter period of time than the time stamps for the location information entries in the LADS. According to some embodiments, the SADS and LADS may each have minimum thresholds of time over which data is collected. That is, the time stamps of the location information entries in each of the SADS and LADS may span a minimum period of time. In some embodiments, the SADS may include location information entries from a time period that overlaps with the LADS (e.g., the most recent location information entries from the SADS may also be in the LADS). In some embodiments, the SADS may include location information entries that are not included in the LADS (e.g., the time period of the SADS may follow the time period of the LADS).

Some embodiments may additionally include a minimum threshold of districts from which data is accumulated. For example (continuing with the example above where first and second calculations are based on first and second subsets of the plurality of location information entries), the method 400 can further include determining, for each location information entry of the first subset of the plurality of location information entries, a district corresponding to the location of the a mobile device, and further determining that a number of unique districts corresponding to the first subset of the plurality of location information entries meets a certain minimum threshold. Such functionality can help ensure geographical diversity within the coverage region, which can help ensure better accuracy in the calculation of the approximate coverage region and/or location of the antenna.

Once a change is calculated, an almanac of the locations of antennas can be updated to reflect the change. In some embodiments, the positioning server 160 can store and update the almanac, and help ensure that the updated almanac is propagated to mobile devices in a mobile network to account for short-term changes indicated by the SADS. For example, a mobile network may temporarily activate a new antenna to provide additional coverage where a large event (e.g., baseball game, concert, convention, etc.) is taking place. The new antenna may be detected by the SADS, and an approximate location and/or coverage area can be calculated utilizing the techniques described herein. This new information can be incorporated into a new version of an almanac, which can be propagated to mobile devices from the positioning server 160 (or other device maintaining the almanac). When the newly-added antenna goes offline (e.g., when the event is over), the techniques herein can be used to determine that the antenna has been removed, the almanac can be updated once again to reflect this change, and the updated almanac can be propagated to mobile devices.

The method may comprise other variations as described herein above. For example, the calculating in block 420 may comprise determining a weighted mean and/or weighted median based on the location data of each location information entry of the plurality of location information entries. Additionally or alternatively, the calculating in block 420 may comprise determining, for each location information entry of the plurality of location information entries, representative coordinates of a district corresponding to the location of the a mobile device as shown, for example, in FIG. 2. A person of ordinary skill in the art will recognize many other variations to the method 400 of FIG. 4.

Figure 5:
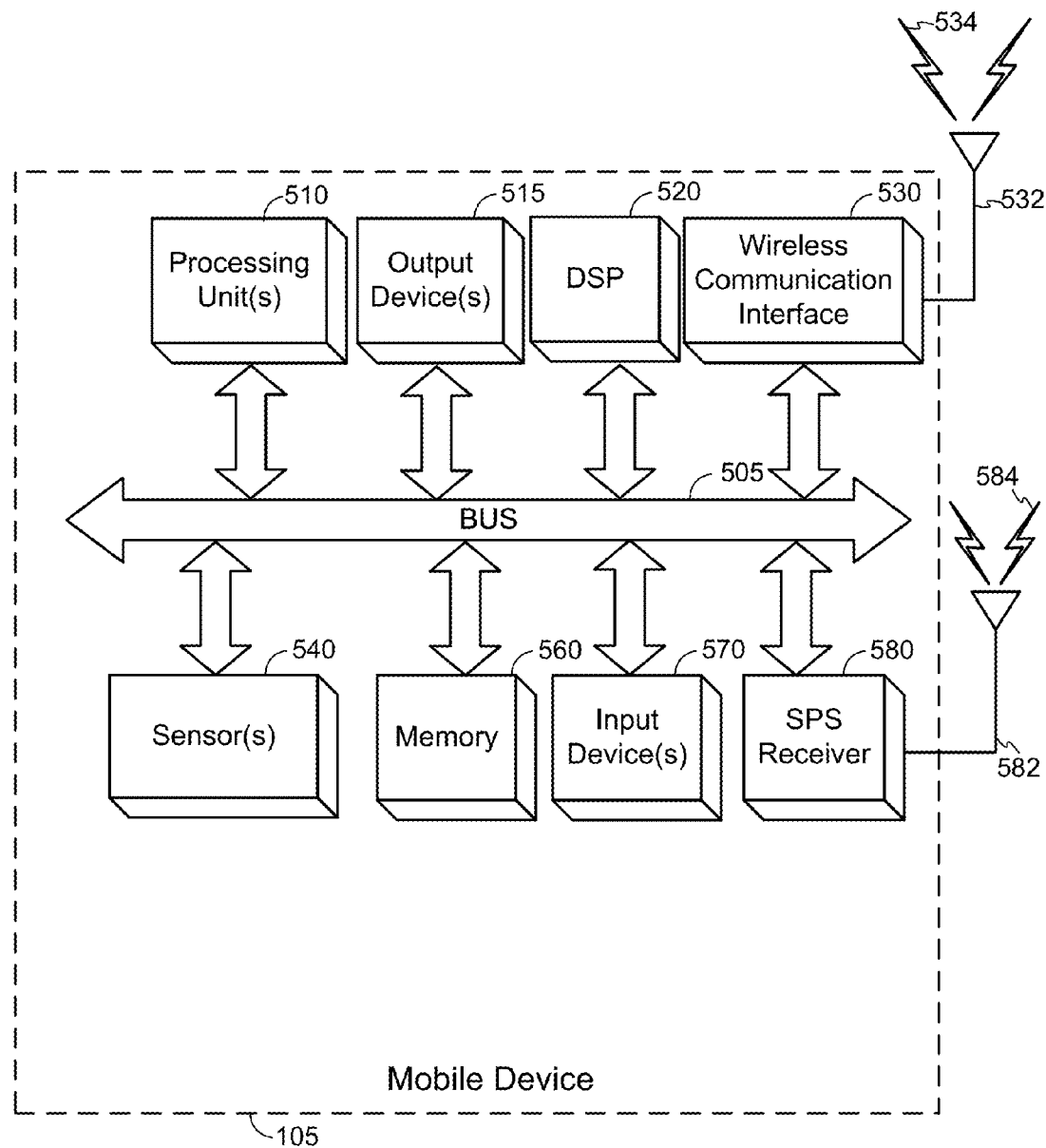
FIG. 5 is a block diagram an embodiment of a mobile device.

FIG. 5 illustrates an embodiment of a mobile device 105, which can be utilized as described herein above. For example, the mobile device 105 can be used in the cell location estimation system 100 of FIG. 1 and/or to provide data or perform other functions as described in relation to FIGS. 2 and 3. It should be noted that FIG. 5 is meant only to provide a generalized illustration of various components, any or all of which may be utilized as appropriate. It can be noted that, in some instances, components illustrated by FIG. 5 can be localized to a single physical device and/or distributed among various networked devices, which may be disposed at different physical locations.

The mobile device 105 is shown comprising hardware elements that can be electrically coupled via a bus 505 (or may otherwise be in communication, as appropriate). The hardware elements may include a processing unit(s) 510 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 5, some embodiments may have a separate DSP 520, depending on desired functionality. The mobile device 105 also may comprise one or more input devices 570, which may comprise without limitation a touch screen, a touch pad, microphone, button(s), dial(s), switch(es), and/or the like; and one or more output devices 515, which may comprise without limitation a display, light emitting diode (LED), speakers, and/or the like.

The mobile device 105 might also include a wireless communication interface 530, which may comprise without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities, etc.), and/or the like. The wireless communication interface 530 may permit data (such as location information, as described in the embodiments herein) to be communicated with a network, wireless access points, other computer systems, and/or any other electronic devices described herein, such as the wireless network 140, internet 150, and/or other networks described in relation to FIG. 1. The communication can be carried out via one or more wireless communication antenna(s) 532 that send and/or receive wireless signals 534.

Depending on desired functionality, the wireless communication interface 530 may comprise separate transceivers to communicate with base transceiver stations (e.g., antenna 120) and other wireless devices and access points. As indicated previously with respect to FIG. 1, these different data networks may comprise various network types. Additionally, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The mobile device 105 can further include sensor(s) 540. Such sensors may comprise, without limitation, one or more accelerometer(s), gyroscope(s), camera(s), magnetometer(s), altimeter(s), microphone(s), proximity sensor(s), light sensor(s), and the like. Some or all of the sensor(s) 540 can be utilized, among other things, for dead reckoning and/or other positioning methods. Such positioning methods may be used to determine a location of the mobile device 105, which can be provided to a positioning server as detailed herein.

Embodiments of the mobile device may also include an SPS receiver 580 capable of receiving signals 584 from one or more SPS satellites (such as SPS satellites 110, of FIG. 1) using an SPS antenna 582. Such positioning can be utilized to complement and/or incorporate the techniques described herein. The SPS receiver 580 can extract a position of the mobile device, using conventional techniques, from SPS SVs of an SPS system, such as GNSS (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 580 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 560. The memory 560 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 560 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 105 (and/or a processing unit within a mobile device 105) (and/or another device of a positioning system). In an aspect, then, such code and/or instructions can be used to configure and/or adapt a general purpose computer (or other device) to perform one or more operations in accordance with the described methods.

FIG. 6 illustrates an embodiment of a computer system 600, which may be incorporated, at least in part, into devices such as the positioning server 160 of FIG. 1, and/or a computing device incorporated and/or communicatively connected therewith, as described herein. FIG. 6 provides a schematic illustration of one embodiment of a computer system 600 that can perform the methods provided by various other embodiments, such as the method described in relation to FIG. 4. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. In addition, it can be noted that components illustrated by FIG. 6 can be localized to a single device and/or distributed among various networked devices, which may be disposed at different physical locations.

The computer system 600 is shown comprising hardware elements that can be electrically coupled via a bus 605 (or may otherwise be in communication, as appropriate). The hardware elements may include processing unit(s) 610, which may comprise without limitation one or more general-purpose processors, one or more special-purpose processors (such as digital signal processing chips, graphics acceleration processors, and/or the like), and/or other processing structure, which can be configured to perform one or more of the methods described herein, including the methods described in relation to FIGS. 3-4. The computer system 600 also may comprise one or more input devices 615, which may comprise without limitation a mouse, a keyboard, a camera, a microphone, and/or the like; and one or more output devices 620, which may comprise without limitation a display device, a printer, and/or the like.

The computer system 600 may further include (and/or be in communication with) one or more non-transitory storage devices 625, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which may comprise wireless communication technologies managed and controlled by a wireless communication interface 633, as well as wired technologies. As such, the communications subsystem may comprise a modem, a network card (wireless or wired), an infrared communication device, a wireless communication device, and/or a chipset (such as a Bluetooth™ device, an IEEE 802.11 device, an IEEE 802.15.4 device, a WiFi device, a WiMax device, cellular communication facilities, UWB interface, etc.), and/or the like. The communications subsystem 630 may include one or more input and/or output communication interfaces, such as the wireless communication interface 633, to permit data to be exchanged with a network, mobile devices (such as the mobile device 105 of FIG. 1), other computer systems, and/or any other electronic devices described herein. Hence, the communications subsystem 630 may be used to receive and send data (e.g., location data, and almanac, etc.) as described in the embodiments herein.

In many embodiments, the computer system 600 will further comprise a working memory 635, which may comprise a RAM or ROM device, as described above. Software elements, shown as being located within the working memory 635, may comprise an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 3-4, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods. For example, the computer system 600 and software elements can be used to build and maintain an almanac as described herein (e.g., a database and/or other data structure that has the approximate locations of a plurality of antennas and/or the approximate coverage regions of the plurality of antennas. These approximate locations and/or coverage regions can be determined and/or updated using the techniques described herein. When changes to the almanac are made (e.g., due to changes detected using the techniques described herein), the changes can be propagated to mobile devices via the Internet and/or other communication networks. Depending on desired functionality, these changes can be propagated individually or as part of a revised almanac. Also, depending on desired functionality, revisions can be propagated once a change is detected, periodically (e.g., every night at midnight, if any changes are detected), and/or based on other schedules and/or triggering events.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

It can be noted that the term "cell ID" is used herein to describe an identifier of a "cell," according to some embodiments. Other embodiments, however, may include other identifiers, in which the corresponding "cell" could be an area of coverage for a non-cell network. Additionally, the term cell is frequently used herein to describe the coverage of an antenna, although it will be understood that an antenna may be associated with more than one cell. It is common, for example, that an antenna (or antenna array) covers a circular area split three ways circumferentially among three cells (each cell spanning approximately 120 degrees of the circular area). Additionally, it will be understood that embodiments in which the Internet is used may additionally or alternatively use one or more other public and/or private data networks.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method of estimating wireless network coverage, the method comprising:
   accumulating, over a period of time, location information received from a plurality of mobile devices located within range of an antenna in a wireless network, wherein the accumulated location information comprises a plurality of location information entries, each location information entry comprising:
      location data indicative of a location of a mobile device,
      a time indicator associated with the location data, and
      an identifier associated with the antenna; and
   calculating an approximate coverage region of the antenna, an approximate location of the antenna, or both;
   wherein:
      the calculating is based at least in part on the location data and the identifier of each of the plurality of location information entries, and
      the location data is selected based on the time indicator; and
   determining, based on the calculating, a change in the approximate coverage region of the antenna, the approximate location of the antenna, or both;
      wherein determining the change further comprises comparing a first calculation with a second calculation, wherein:
      the first calculation is based on a first subset of the plurality of location information entries having corresponding time indicators spanning over a first period within the period of time, and
      the second calculation is based on a second subset of the plurality of location information entries having corresponding time indicators spanning over a second period within the period of time, the second period being shorter than the first period; and
      communicating at least a portion of an updated almanac to one or more mobile devices.

2. The method of claim 1, further comprising updating the almanac having approximate locations of a plurality of antennas, approximate coverage regions of the plurality of antennas, or both; wherein the updating comprises indicating, in the almanac, the change.

3. The method of claim 1, wherein the second period follows the first period.

4. The method of claim 1, wherein the second period overlaps with the first period.

5. The method of claim 1, wherein the calculating comprises:
   determining, for each location information entry of the first subset of the plurality of location information entries, a district corresponding to the location of the mobile device; and
   using, in the first calculation, a number of unique districts corresponding to the first subset of the plurality of location information entries, wherein the number of unique districts meets a certain minimum threshold.

6. The method of claim 1, wherein the calculating comprises:
   determining, for each location information entry of the second subset of the plurality of location information entries, a district corresponding to the location of the mobile device; and
   using, in the second calculation, a number of unique districts corresponding to the second subset of the plurality of location information entries, wherein the number of unique districts meets a certain minimum threshold.

7. The method of claim 1, wherein the calculating comprises determining a weighted mean based on location data of at least two location information entries of the plurality of location information entries.

8. The method of claim 1, wherein the calculating comprises determining a weighted median based on location data of at least two location information entries of the plurality of location information entries.

9. The method of claim 1, wherein the calculating comprises determining, for each location information entry of the plurality of location information entries, representative coordinates of a district corresponding to the location of the mobile device.

10. A server for estimating wireless network coverage, the server comprising:
   a communication interface configured to receive location information from a plurality of mobile devices located within range of an antenna in a wireless network;
   a memory configured to accumulate the location information over a period of time, wherein the accumulated location information comprises a plurality of location information entries, each location information entry comprising:
      location data indicative of a location of a mobile device,
      a time indicator associated with the location data, and
      an identifier associated with the antenna; and
   a processor communicatively coupled with the communication interface and the memory and configured to;
   calculate an approximate coverage region of the antenna, an approximate location of the antenna, or both;
   wherein:
      the calculating is based at least in part on the location data and the identifier of each of the plurality of location information entries, and
      the location data is selected based on the time indicator;
   determine, based on the calculating, a change in the approximate coverage region of the antenna, the approximate location of the antenna, or both;

wherein determining the change further comprises comparing a first calculation with a second calculation; and wherein:

the first calculation is based on a first subset of the plurality of location information entries having corresponding time indicators spanning over a first period within the period of time, and the second calculation is based on a second subset of the plurality of location information entries having corresponding time indicators spanning over a second period within the period of time, the second period being shorter than the first period; and cause the server to communicate, via the communication interface, at least a portion of an updated almanac to multiple mobile devices.

11. The server of claim 10, wherein:
the memory is configured to store the almanac comprising approximate locations of a plurality of antennas, and
the processor is further configured to cause the server to update the almanac based on the determined change by altering an approximate location of at least one antenna of the plurality of antennas.

12. The server of claim 10, wherein the processor is configured to implement the calculating by:
determining, for each location information entry of the first subset of the plurality of location information entries, a district corresponding to the location of the mobile device; and
determining that a number of unique districts corresponding to the first subset of the plurality of location information entries meets a certain minimum threshold.

13. The server of claim 10, wherein the processor is configured to implement the calculating by:
determining, for each location information entry of the second subset of the plurality of location information entries, a district corresponding to the location of the mobile device; and
determining that a number of unique districts corresponding to the first subset of the plurality of location information entries meets a certain minimum threshold.

14. The server of claim 10, wherein the processor is configured to determine, for each location information entry of the plurality of location information entries, representative coordinates of a district corresponding to the location of the mobile device.

15. An apparatus comprising a processor and a memory, for estimating wireless network coverage, comprising:
means for accumulating, over a period of time, location information received from a plurality of mobile devices located within range of an antenna in a wireless network, wherein the accumulated location information comprises a plurality of location information entries, each location information entry comprising:
location data indicative of a location of a mobile device,
a time indicator associated with the location data, and
an identifier associated with the antenna; and
means for calculating an approximate coverage region of the antenna, an approximate location of the antenna, or both;
wherein:
the calculating is based at least in part on the location data and the identifier of each of the plurality of location information entries, and
the location data is selected based on the time indicator;
means for determining, based on the calculating, a change in the approximate coverage region of the antenna, the approximate location of the antenna, or both;

wherein the means for determining the change further comprises means for comparing a first calculation with a second calculation, wherein:

the first calculation is based on a first subset of the plurality of location information entries having corresponding time indicators spanning over a first period within the period of time, and the second calculation is based on a second subset of the plurality of location information entries having corresponding time indicators spanning over a second period within the period of time, the second period being shorter than the first period; and means for communicating at least a portion of an updated almanac to multiple mobile devices.

16. The apparatus of claim 15, further comprising means for updating the almanac having approximate locations of a plurality of antennas, the updating comprising altering an approximate location of at least one antenna of the plurality of antennas.

17. The apparatus of claim 15, wherein the means for calculating comprises:
means for determining, for each location information entry of the first subset of the plurality of location information entries, a district corresponding to the location of the mobile device; and
means for determining that a number of unique districts corresponding to the first subset of the plurality of location information entries meets a certain minimum threshold.

18. The apparatus of claim 15, wherein the means for calculating comprises:
means for determining, for each location information entry of the second subset of the plurality of location information entries, a district corresponding to the location of the mobile device; and
means for determining that a number of unique districts corresponding to the first subset of the plurality of location information entries meets a certain minimum threshold.

19. A non-transitory computer-readable storage medium having instructions embedded thereon that, when executed by one or more electronic devices, cause the one or more electronic devices to:
accumulate, over a period of time, location information received from a plurality of mobile devices located within range of an antenna in a wireless network, wherein the accumulated location information comprises a plurality of location information entries, each location information entry comprising:
location data indicative of a location of a mobile device,
a time indicator associated with the location data, and
an identifier associated with the antenna;
calculate an approximate coverage region of the antenna, an approximate location of the antenna, or both;
wherein:
the calculating is based at least in part on the location data and the identifier of each of the plurality of location information entries, and
the location data is selected based on the time indicator;
determine, based on the calculating, a change in the approximate coverage region of the antenna, the approximate location of the antenna, or both;

wherein determining the change further comprises comparing a first calculation with a second calculation, wherein:

the first calculation is based on a first subset of the plurality of location information entries having corresponding time indicators spanning over a first period within the period of time, and the second calculation is based on a second subset of the plurality of location information entries having corresponding time indicators spanning over a second period within the period of time, the second period being shorter than the first period; and communicate at least a portion of an updated almanac to multiple mobile devices.

* * * * *